United States Patent
Liang et al.

(10) Patent No.: US 9,552,272 B1
(45) Date of Patent: Jan. 24, 2017

(54) UTILITY TO INSTANTLY PROTECT SENSITIVE INFORMATION FOR AN APPLICATION LOG AT RUNTIME

(75) Inventors: Cheng-hsuan Liang, Fremont, CA (US); Xiaozhong Wang, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/194,741

(22) Filed: Jul. 29, 2011

(51) Int. Cl.
*G06F 7/04* (2006.01)
*G06F 17/30* (2006.01)
*H04N 7/16* (2011.01)
*G06F 11/30* (2006.01)
*G06F 11/07* (2006.01)
*G06F 11/22* (2006.01)

(52) U.S. Cl.
CPC ....... *G06F 11/3068* (2013.01); *G06F 11/0778* (2013.01); *G06F 11/3065* (2013.01); *G06F 11/2268* (2013.01)

(58) Field of Classification Search
CPC .................. G06F 11/22; G06F 11/2268; G06F 11/0766–11/0787; G06F 11/3065–11/3086
USPC .................................. 713/165, 167; 717/128
See application file for complete search history.

(56) References Cited

U.S. PATENT DOCUMENTS

| | | | | |
|---|---|---|---|---|
| 6,836,881 B2* | 12/2004 | Beynon et al. | ............... | 717/128 |
| 7,475,260 B2* | 1/2009 | Curtis | ................. | G06Q 20/389 713/189 |
| 7,739,374 B1* | 6/2010 | Frey | .................... | G06F 11/0709 709/223 |
| 7,873,838 B2* | 1/2011 | Staddon | ............... | H04L 9/0894 380/277 |
| 8,166,313 B2* | 4/2012 | Fedtke | ................ | G06F 21/6254 713/161 |
| 8,433,733 B2* | 4/2013 | Sayed et al. | .................. | 707/821 |
| 2003/0105958 A1* | 6/2003 | McArdle | ................ | G06F 21/62 713/167 |
| 2006/0005017 A1* | 1/2006 | Black | .................. | H04L 63/0428 713/165 |

* cited by examiner

*Primary Examiner* — Daniel Potratz
(74) *Attorney, Agent, or Firm* — Wilmer Cutler Pickering Hale and Dorr LLP

(57) ABSTRACT

A computing system intercepts a message generated by an application at runtime. The message has content to be logged in a log data store. The computing system identifies sensitive information in the message content and modifies the message content to protect the sensitive information. The computing system causes the modified message content to be logged in the log data store.

20 Claims, 7 Drawing Sheets

UTILITY TO INSTANTLY PROTECT SENSITIVE INFORMATION FOR AN APPLICATION LOG AT RUNTIME

TECHNICAL FIELD

Embodiments of the present invention relate to protecting sensitive information. Specifically, the embodiments of the present invention relate to protecting sensitive information for an application log at runtime.

BACKGROUND

Logging is a common practice for software developers of applications, such as web applications. Developers can use the data from a log, for example, for debugging the application, for generating statistics relating to an application, etc. Some applications, however, utilize sensitive information, such as credit card numbers, social security numbers, account numbers, etc., and at times, the sensitive information is written to a log, which poses security problems due to the highly sensitive nature of this information. The log becomes a possible point of potential theft or accidental distribution of the sensitive information. Theft of information represents a significant business risk in terms of the legal liabilities related to regulatory compliance. For example, to be PCI (Payment Card Industry) compliant, applications cannot log any sensitive data, such as passwords and credit card numbers, in a log.

Traditionally, application developers have manually inspected the application source code to help prevent any sensitive data from being written to a log. However, this traditional solution is prone to human error. In addition, as object oriented programming gets more complicated, it is often difficult to manually inspect the source code. Other conventional solutions implement a log monitoring tool to automatically and periodically inspect a log. When the monitoring tool detects sensitive information in a log, it can remove it from the log. However, there still remains a time where the sensitive information is stored in the log and during that time, the log is still a point of potential theft and prone to data loss.

SUMMARY

In one embodiment, a system for protecting sensitive information for an application log at runtime is described. An exemplary system may include a memory and a processor that is coupled to the memory. In one embodiment, the system intercepts a message generated by an application at runtime. The message has content to be logged in a log data store. The system identifies sensitive information in the message content and modifies the message content to protect the sensitive information. The system causes the modified message content to be logged in the log data store.

In one embodiment, the sensitive information comprises one or more of a credit card number, a social security number, an account number, an employee number, a customer or patient number, an IP address, a driver license number, a license plate number, a password, a telephone number, a name, a username, and a birthdate.

In some embodiments of the exemplary system, the memory stores sensitive data patterns for sensitive information and exceptional case data patterns for exceptional cases. The system identifies sensitive information in the message content by finding one or more sets of data in the message that have a format that matches any of the sensitive data patterns, validating at least one found set of data is not a false positive by using sensitive data validators, and determining that at least one validated set of data does not contain data in a format that matches any of the exceptional case data patterns. In one embodiment, the system modifies the message content to protect the sensitive information by removing the sensitive information, masking the sensitive information, and/or redacting the sensitive information to create the protected information. In one embodiment, the modified message content comprises a line number of application source code that generated the message that is being intercepted.

In one embodiment, the message is a composite message comprising at least one computer programming class object and the system is to modify the message content to protect the sensitive information by removing the sensitive information, masking the sensitive information, and/or redacting the sensitive information to create the protected information. The system creates at least one new class object, which has a new message having the protected information, to be logged in the log data store.

In addition, a non-transitory computer readable storage medium for protecting sensitive information for an application log at runtime is described. An exemplary non-transitory computer readable storage medium includes instructions that will cause a processor to intercept a message generated by an application at runtime and having content to be logged in a log data store, identify sensitive information in the message content, modify the message content to protect the sensitive information, and cause the modified message content to be logged in the log data store.

Further, a method for protecting sensitive information for an application log at runtime is described. In one embodiment, a method comprises intercepting a message generated by an application at runtime, the message having content to be logged in a log data store, identifying sensitive information in the message content, modifying the message content to protect the sensitive information, and causing the modified message content to be logged in the log data store.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for protecting sensitive information for an application log at runtime. A computing system intercepts a message generated by an application at runtime. The message has content to be logged in a log data store. The computing system identifies sensitive information in the message content and protects the sensitive information. The computing system provides the protected information to a logging module to log the protected information in the log data store. Embodiments of the present invention can prevent sensitive data from being logged in a log data store and reduce the risk of data loss that may be associated with the log data store.

Figure 1:
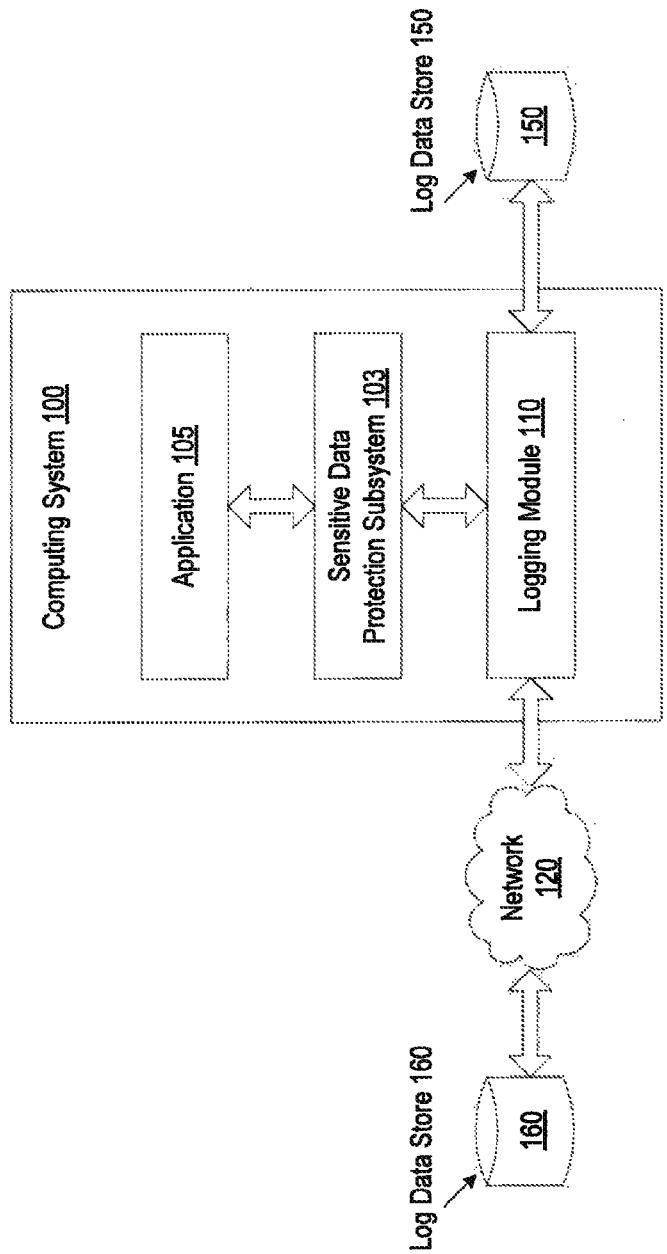
FIG. 1 is an exemplary computing system in which embodiments of the present invention may operate.

FIG. 1 is a block diagram of an exemplary computing system 100 in which embodiments of the present invention can be implemented. A computing system 100 can be hosted by any type of computing device including server computers, gateway computers, client computers, desktop computers, laptop computers, mobile communications devices, cell phones, smart phones, hand-held computers, or similar computing device. An exemplary computing device is described in greater detail below in conjunction with FIG. 6.

The computing system 100 can host one or more applications 105. An application 105 can represent one or more applications of any type including, for example, a browser application, a web application, a desktop application, etc. An application 105 can use a logging module 110 to log data in a log data store 150,160 that is coupled to the computing system 100. The data stored in a log data store 150,160 can represent the state of an application 105 at various stages of its execution.

A log data store 150,160 can be a table, a spreadsheet, a flat file, etc. A log data store 150,160 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

A logging module 110 can be, for example, a logging framework, a logging utility, a logging application program interface (API), and logging library. Examples of a logging module 110, can include, and are not limited to, Apache log 4j, Java Logging API, Apache Commons Logging, and SLF4J. An application 105 can make method calls to the logging module 110 to cause the logging module 110 to write data in a log data store 150,160. For example, a Java-based application makes method calls to log 4j to log data.

In one embodiment, the application 105, logging module 110, and log data store 150 reside in the same computing device. In another embodiment, the application 105 and logging module 110 are coupled to a log data store 160 via a network 120. The network 120 can be a local area network (LAN), a wireless network, a mobile communications network, a wide area network (WAN), such as the Internet, or similar communication system. The network 120 can include any number of networking and computing devices such as wired and wireless devices.

The data that is logged in a log data store 150,160 can be any data which a user, such as an application 105 programmer, wishes to log. A user can create a 'message' to define the data to be logged and include the message in the application 105 source code. For example, a programmer writes a message that includes a string "The values of parameters passed to method Foo are" as an output statement in the application 105 source code, such that the application 105 generates the message at runtime when the application 105 is passing parameters to method Foo, and the logging module 110 records the message in a log data store 150,160. A message is also hereinafter referred to as an application message. A programmer can manually write messages in the application 105 source code and/or can use the logging module 110 to insert, modify, and update application messages without changing the application 105 source code.

A message to be logged in a log data store 150,160 can be a simple message or a composite message. The content of a simple message can include, and is not limited to, a string. The content of a composite message can include one or more programming class objects and one or more simple messages. Some logging modules 110, such as Apache log 4j, can log a programming class object to a log. For example, log 4j has the capability to log an object from a throwable class, which is the class of all errors and exceptions in the Java language, in a log data store 150,160. When an exception occurs at application 105 runtime, the logging module 110 can log a throwable object.

The computing system 100 hosts a sensitive data protection subsystem 103. The sensitive data protection subsystem 103 intercepts messages from an application 105 at runtime, which are intended to be logged in a log data store 150,160. The sensitive data protection subsystem 103 can search the intercepted messages for sensitive information. The sensitive information can be grouped by type. Examples of types of sensitive information can include, and are not limited to, personal identifiers, bank names, credit card institution names, account balances, etc. A type of sensitive information can have various sub-types. For example, the personal identifier type can have sub-types, such as, credit card numbers, social security numbers, account numbers, employee numbers, customer or patient numbers, IP addresses, driver license numbers, license plate numbers, passwords, telephone numbers, names, usernames, birthdates, etc. The sensitive information, which the sensitive data protection subsystem 103 searches for, is not limited to personal identifiers, bank names, credit card institution names, account balances, and includes any type and/or sub-type of sensitive information as defined by a user. Sensitive data can include confidential information of entities, e.g., a credit card number, a social security number, an account number, an employee number, a customer or patient number, an IP address, a driver license number, a license plate number, a password, a telephone number, a name, a username, and a birthdate. The sensitive data protection subsystem 103 can detect sensitive information in the messages in the form of sensitive data identifiers, such as personal identifiers, bank name identifiers, credit card institution name identifiers, account balance identifiers, etc.

Unlike conventional solutions, which write sensitive data to a log and modify the sensitive data after it is written to the log, the sensitive data protection subsystem 103 can find sensitive data in an intercepted application message, and respond to it on the fly before writing anything to the log. In particular, the sensitive data protection subsystem 103 can protect any sensitive data that is found in a message, and provide the protected data to the logging module 110 to log to a log data store 150,160. For example, the sensitive data protection subsystem 103 can detect a credit card number in an application message and remove, mask, and/or redact the credit card number before the credit card number is written to a log data store 150,160.

Figure 2:
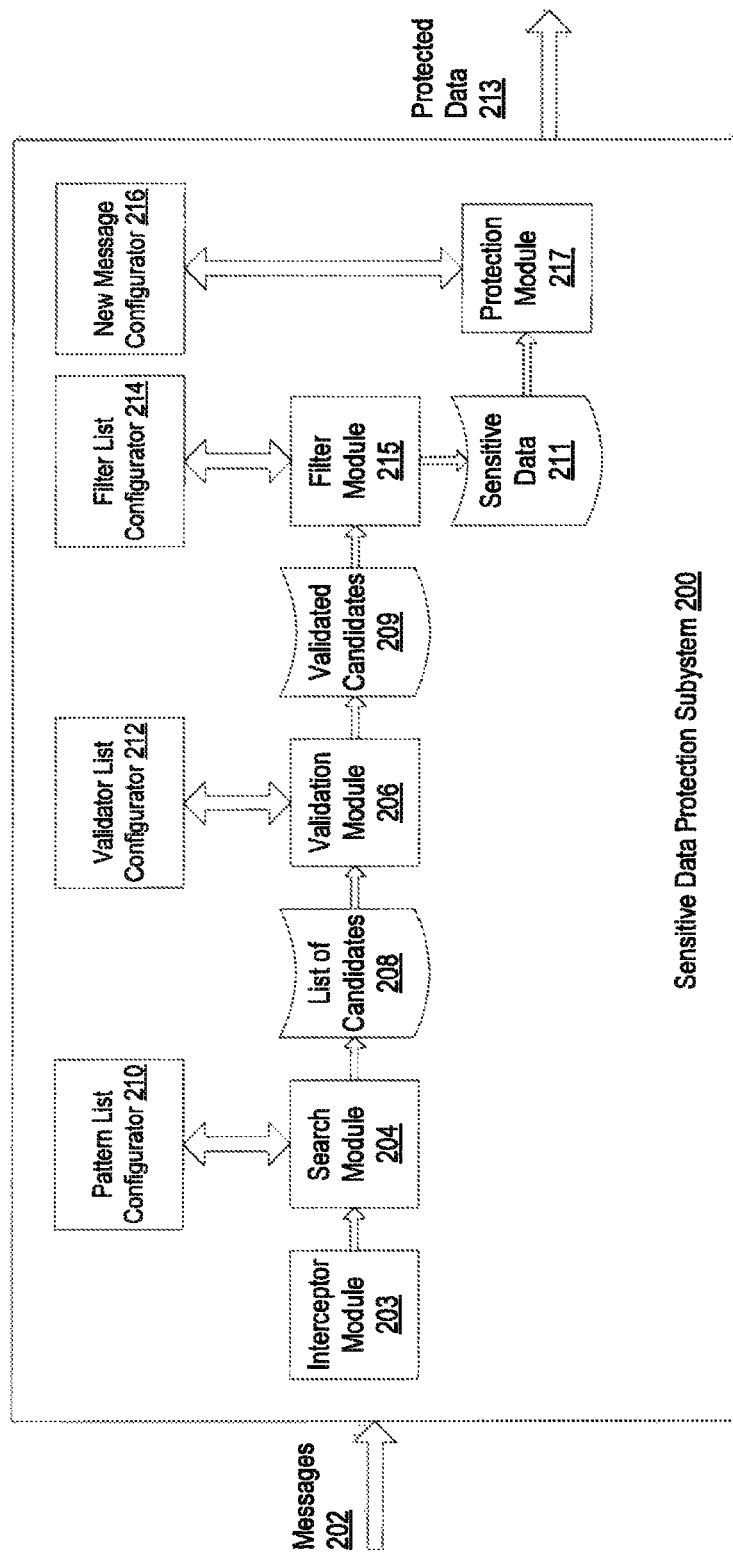
FIG. 2 is a block diagram of one embodiment of a sensitive data protection subsystem.

FIG. 2 is a block diagram of one embodiment of a sensitive data protection subsystem 200. The sensitive data protection subsystem 200 may include an interceptor module 203, a search module 204, a validation module 206, a filter module 215, and a protection module 217. The modules can be combined together or separated in further modules, according to a particular embodiment.

The interceptor module 203 intercepts method calls which an application makes to a logging module at runtime. The interceptor module 203 intercepts the application messages 202 that are related to the method calls and can identify whether a message 202 is a simple message or a composite message. The interceptor module 203 can determine that a message 202 is a composite message by detecting a computer programming class object in the message 202. For example, the interceptor module 203 may detect an object from a Java throwable class in a message 202. The interceptor module 203 can determine a message is a simple message by not detecting a class object in the message 202.

The search module 204 searches the intercepted messages 202 for data resembling sensitive information. The search is performed based on data formats of sensitive information, rather than their actual values. In other words, the search module 204 searches for data in a message that looks like, for example, a personal identifier, without knowing the value of the personal identifier. The search module 204 can search the intercepted messages 202 using sensitive data patterns that are stored in a data store that is coupled to the sensitive data protection subsystem 200. For example, the sensitive data patterns may be patterns for detecting personal identifiers, bank names, credit card institution names, account balances, etc.

Sensitive data, such as a personal identifier, financial institution name, account number, may have multiple format variations, and the search module 204 uses sensitive data patterns that include rigid pattern formats of sensitive data and their variations. The sensitive data patterns correspond to variations of sensitive data formats. The sensitive data patterns used by the search module 204 are configurable by a pattern list configurator 210. There can be a pattern list configurator 210 for each type and/or sub-type of sensitive data. In one embodiment, a user, such as an application developer, can provide input to configure the sensitive data protection subsystem 200. Specifically, the user can modify a list of sensitive data patterns (e.g., personal identifier patterns, account balance patterns, financial institution identifier patterns) based on the specific requirements of the user's organizations. For example, the user may add a sensitive data pattern for newly implemented employee numbers. The pattern list configurator 210 may be a GUI facilitating user input of data patterns or an API that receives user-specified data patterns via a designated command. Alternatively, the pattern list configurator 210 may represent a configuration file (e.g., text or XML) that can be modified by the user to add new data patterns or delete or change existing data patterns.

The content of a message 202 can contain multiple sensitive data (e.g., multiple credit card numbers, a credit card number and a phone number, etc.). Once the search module 204 completes the search of a message 202, the search module 204 compiles a list 208 of detected candidates, such as personal identifier candidates, and passes the list 208 to the validation module 206. The detected candidates include matches that have a specific format of a sensitive data identifier (e.g., personal identifier, account balance identifier, etc.) and may potentially constitute a valid sensitive data identifier, such as a valid personal identifier and a valid account balance identifier. However, because the search was not performed for the actual value of a sensitive data identifier, but rather for a matching data pattern, there is a chance that one or more of these candidates were detected due to insufficient accuracy of pattern detection.

The validation module 206 validates each candidate from the list 208 separately. The validation module 206 applies multiple sensitive data validators to each candidate from the list 208 and eliminates candidates that are likely to constitute false positives, producing a list of validated candidates 209 and passing the list 209 to the filter module 215. The sensitive data validators may include, for example, checksum algorithms (e.g., lunh checksum), checks against valid (or invalid) ranges of numbers within a potential match, checks for a valid prefix or suffix of a potential match, checks for valid digits or number of digits within a potential match, search of the message content for one or more keywords, etc.

In one embodiment, the list of validators used by the validation module 206 is configurable by a validator list configurator 212. There can be a validator list configurator 212 for each type and/or sub-type of sensitive data. Specifically, the user of the client can change the list of validators to be used by the sensitive data protection subsystem 200. The validator list configurator 212 may be a GUI facilitating user input of validators or an API that receives user-specified validators via a designated command. Alternatively, the pattern list configurator 210 represents a configuration file (e.g., text or XML) that can be modified by the user to add new sensitive data validators or delete or change existing sensitive data validators. For example, the user may add a sensitive data pattern for newly implemented employee numbers and may add some validators for this sensitive data pattern to the existing list of validators. The sensitive data validators can be stored in a data store that is coupled to the sensitive data protection subsystem 200.

The list of validated candidates 209 may still include false alarms, and the filter module 215 checks each validated candidate from the list 209 separately to determine whether a validated candidate resembles exceptional case data formats of exceptional cases. Examples of exceptional case data patterns for exceptional cases can include, and are not limited to, exceptional data patterns for non-sensitive data as specified by user input, such as session IDs (identifiers), serial numbers, and times stamps. For example, not all 16-digit numbers in a message represents credit card numbers. There may be exceptional cases where 16-digit numbers in a message represent a session ID, a time stamp, a serial number, or some other similar non-sensitive data. One embodiment of filtering out exceptional cases is described in greater detail below in conjunction with FIG. 4.

The exceptional case data patterns for exceptional cases used by the filter module 215 are configurable by a filter list configurator 214. There can be a filter list configurator 214 for each type and/or sub-type of sensitive data. The filter list configurator 214 may be a GUI facilitating user input of data patterns or an API that receives user-specified data patterns via a designated command. Alternatively, the pattern list configurator 210 and the validator list configurator 212 may represent a configuration file (e.g., text or XML) that can be modified by the user to add new exceptional case data patterns or delete or change existing exceptional case data patterns. The exceptional case data patterns can be stored in a data store that is coupled to the sensitive data protection subsystem 200.

Once the filter module 215 completes filtering of the message content in the list of validated candidates 209 that matches exceptional cases, the filter module 215 compiles a list 211 of sensitive data to be protected, and passes the list 211 to the protection module 217. The protection module 217 creates protected data 213 which a logging module can store in a log data store. For a simple message, the protection module 217 can create a new message that has the sensitive data, for example, removed or masked and/or redacted. The new message can include a copy of any content in the original message that is not sensitive data. A new message is configurable by a new message configurator 216. The new message configurator 216 may be a GUI facilitating user input of the configuration of the new message. Alternatively, the pattern list configurator 210, the validator list configurator 212, and/or the filter list configurator 214 may represent a configuration file (e.g., text or XML) that can be modified by the user to add a new message configuration or delete or change existing message configurations.

For a composite message that contains a composite object, which is an object that further contains one or more objects, the interceptor module 203 uses a recursive algorithm to examine the composite object as a whole. An example of a composite object can include, and is not limited to, a throwable object. A throwable object is an object from a throwable class, which is the class of all errors and exceptions in the Java language. A throwable object can contain a simple message that includes information about an error and a cause (cause object), which is another throwable that caused the throwable. The cause is also known as the chained exception facility, as the cause can, itself, have a cause, and so on, leading to a "chain" of exceptions, each caused by another.

In one embodiment, the configurations (e.g., sensitive data patterns, sensitive data validators, exceptional case data patterns) are grouped by the type and/or sub-type of sensitive information. For example, personal identifiers may be a type of sensitive data, and credit card numbers may be a sub-type of the personal identifiers type. All of the sensitive data patterns, validators, and exceptional case patterns for a particular type and/or sub-type (e.g., the credit card sub-type) can be stored together in a data store, for example, in a single file, in a single folder, etc. The sets of configuration data (e.g., sensitive data patterns, validators, exceptional case data patterns) for other types and/or sub-types of sensitive information can be stored, for example, in a different file from the file of the credit card sub-type. For instance, the configuration data for the sub-type IP address can be stored in a file separate from the file of the credit card sub-type.

Figure 3A:
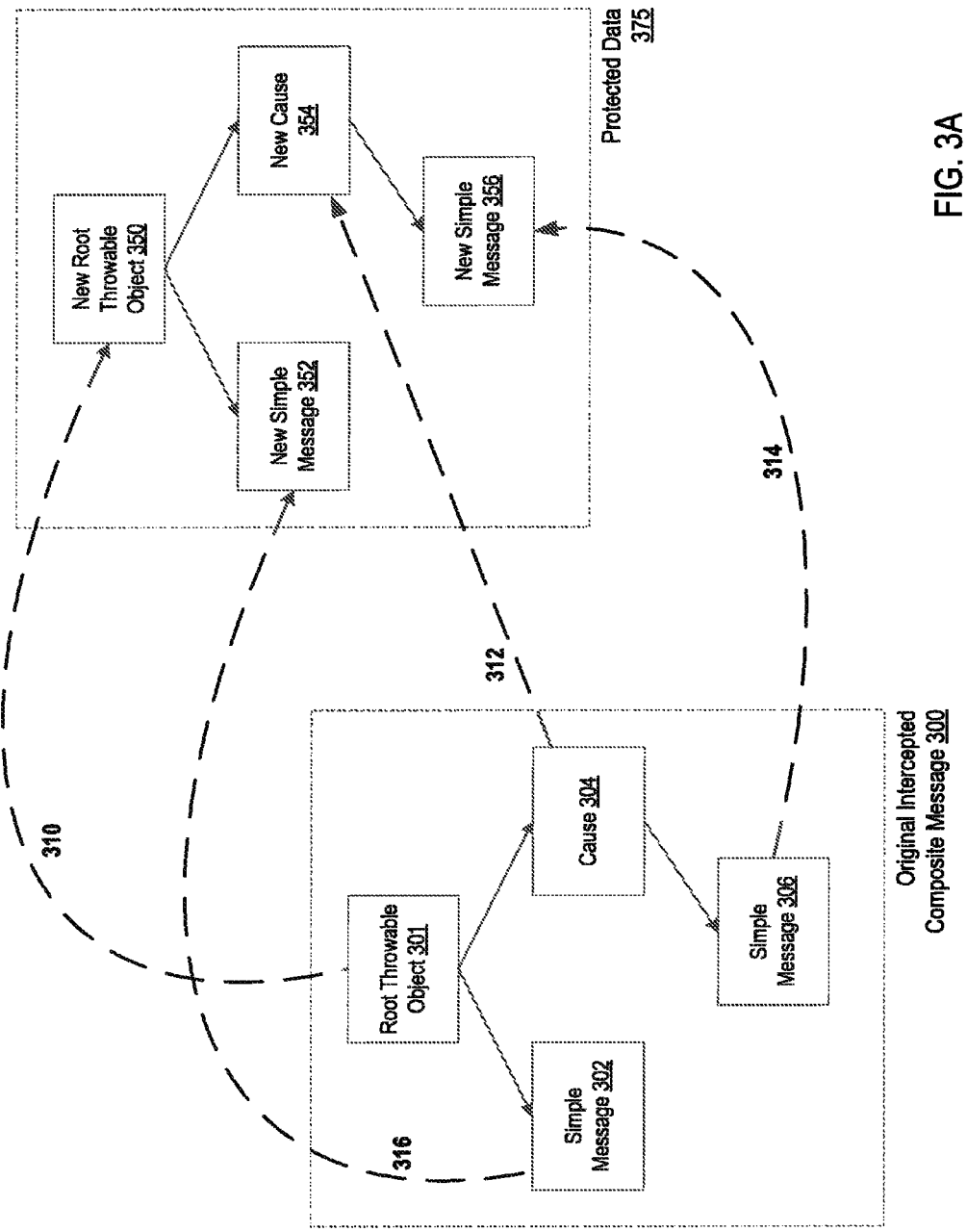
FIGS. 3A and 3B are block diagrams of embodiments for protecting sensitive data in an exemplary composite message containing a throwable object.
Figure 3B:
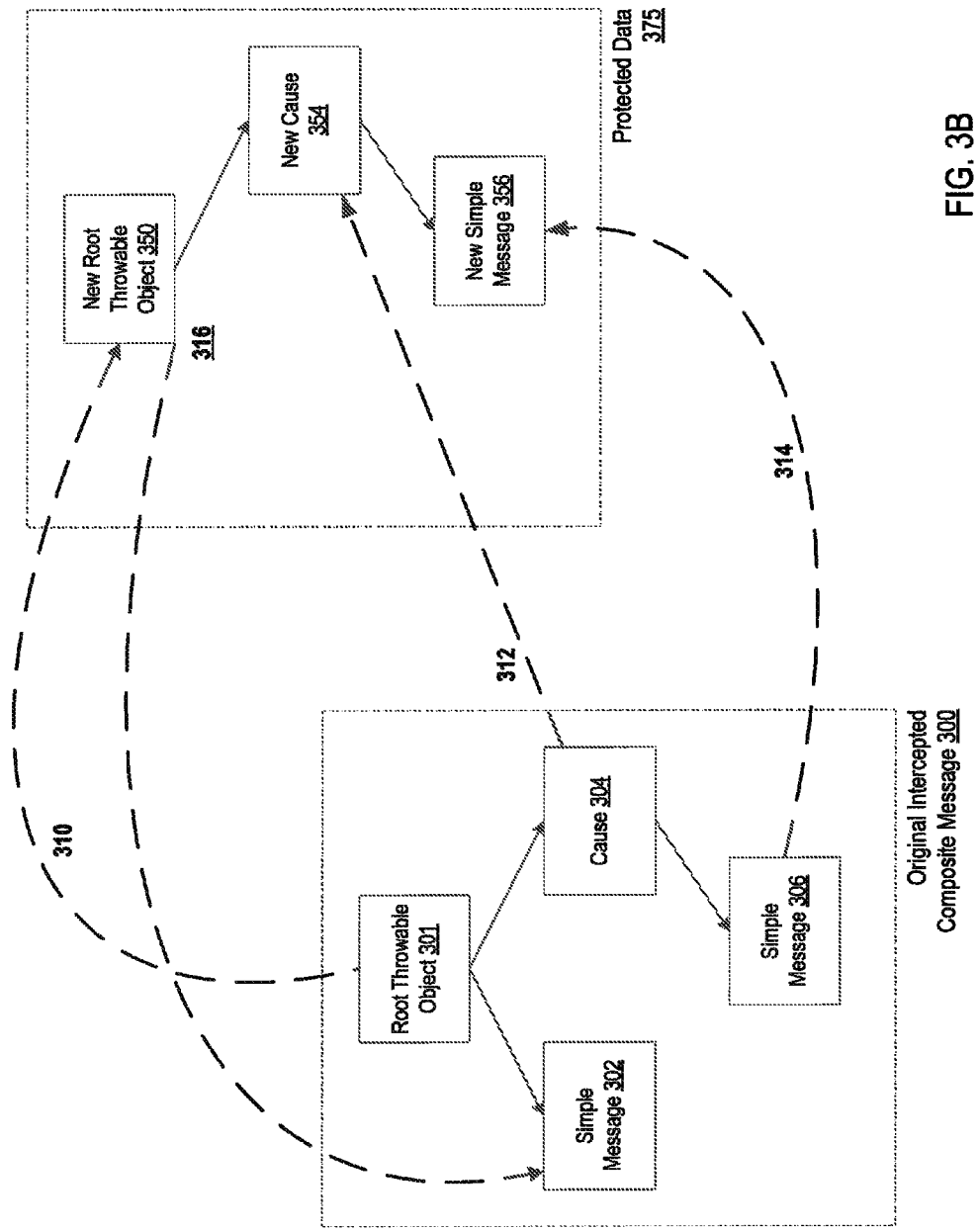

FIGS. 3A and 3B are block diagrams for protecting sensitive data in an exemplary composite message 300 containing a throwable object 301. The block diagrams represent a tree structure of the composite message. For instance, the original intercepted composite message 300 includes a throwable object 301 as the root object, which has two leaves, a simple message 302 and a cause object 304. The cause object 304 has its own leaf of a simple message 306. FIG. 3A is a block diagram of a scenario where all simple messages (e.g., messages 302,306) in the intercepted message 300 contain sensitive information. The interceptor module 203 can start applying a recursive algorithm to reconstruct a tree for the protected data 375 from bottom up. For instance, the interceptor module 203 firsts examines the intercepted simple message 306 of the cause object 304. The search module 204, validation module 206, and filter module 215 determine that there is sensitive data in the simple message 306, and the protection module 217 creates 314 the deepest leaf (e.g., new simple message 356) of the tree for the protected data 375 first. From there, the protection module 217 creates additional leaves moving up the tree. For instance, the protection module 217 creates 312 a new cause object 354. Next, the interceptor module 203 intercepts the simple message 302 to determine whether the simple message 302 contains any sensitive data. The search module 204, validation module 206, and filter module 215 determine that there is sensitive data in the simple message 302, and the protection module 217 creates 316 a new simple message 352. The new messages 352,356 have the sensitive data protected (e.g., removed, masked, redacted). The root for the tree for the protected data 375 is the last element that is reconstructed. For example, the protection module 217 creates 310 a new root throwable object 350. The protection module 217 can provide a logging module the protected data 375 (e.g., protected data 213 in FIG. 2), which includes the new simple message 356, the new cause object 354, the new simple message 352, and the new root throwable object 350.

FIG. 3B is a block diagram of a scenario where at least one simple message (e.g., simple message 302) in the intercepted message 300 does not contain sensitive information. In a preferred embodiment, if a simple message does not contain sensitive information, or if a cause (including all its leaves and intermediate causes) does not contain sensitive information, the protection module 217 does not copy the content of the message or the cause to the new tree. The protection module 217 can include a pointer from a node in the new tree to the original message or original cause to save memory space. For example, simple message 302 does not contain any sensitive information and the protection module 217 creates a pointer 316 from the new root 350 to simple message 302. The protection module 217 can provide a logging module the protected data 375 (e.g., protected data 213 in FIG. 2), which includes the new simple message 356, the new cause object 354, the pointer to the simple message 302, and the new root throwable object 350. In another embodiment, the protection module can create a copy in the new tree of a simple message or cause that does not contain sensitive data. For example, the protection module 217 can create a copy of the simple message 302 in the new root throwable object 350.

Returning to FIG. 2, the protection module 217 can also generate and provide additional information, which is not contained in an original message, to the logging module for the logging module to include in the log data store. Examples of the additional information can include, and are not limited to, the line of the application source code that is associated with a message and keywords that are associated with a message. Unlike conventional offline log analysis tools, the protection module 217 can provide the application stack trace (line number of the application source code), which corresponds to the original message that was intercepted, to a logging module. For example, the line number of the application source code is the line number of the source code that generated the message that is being intercepted. In turn, an application developer does not have to manually inspect the source code, but can use this additional information in the log data store, for example, to identify the origin in the application source code of where there protected information is being printed. The application developer can modify the application source code to stop generating a message that contains the sensitive data.

The protection module 217 can generate and provide one or more keywords, which correspond to an original message that was intercepted, to a logging module. Examples of keywords can include, and are not limited to, the type of sensitive information that was found, such as 'credit card found,' 'account balance found,' 'account number found,' etc. In turn, a monitoring tool can search a log data store for the keywords.

Figure 4:
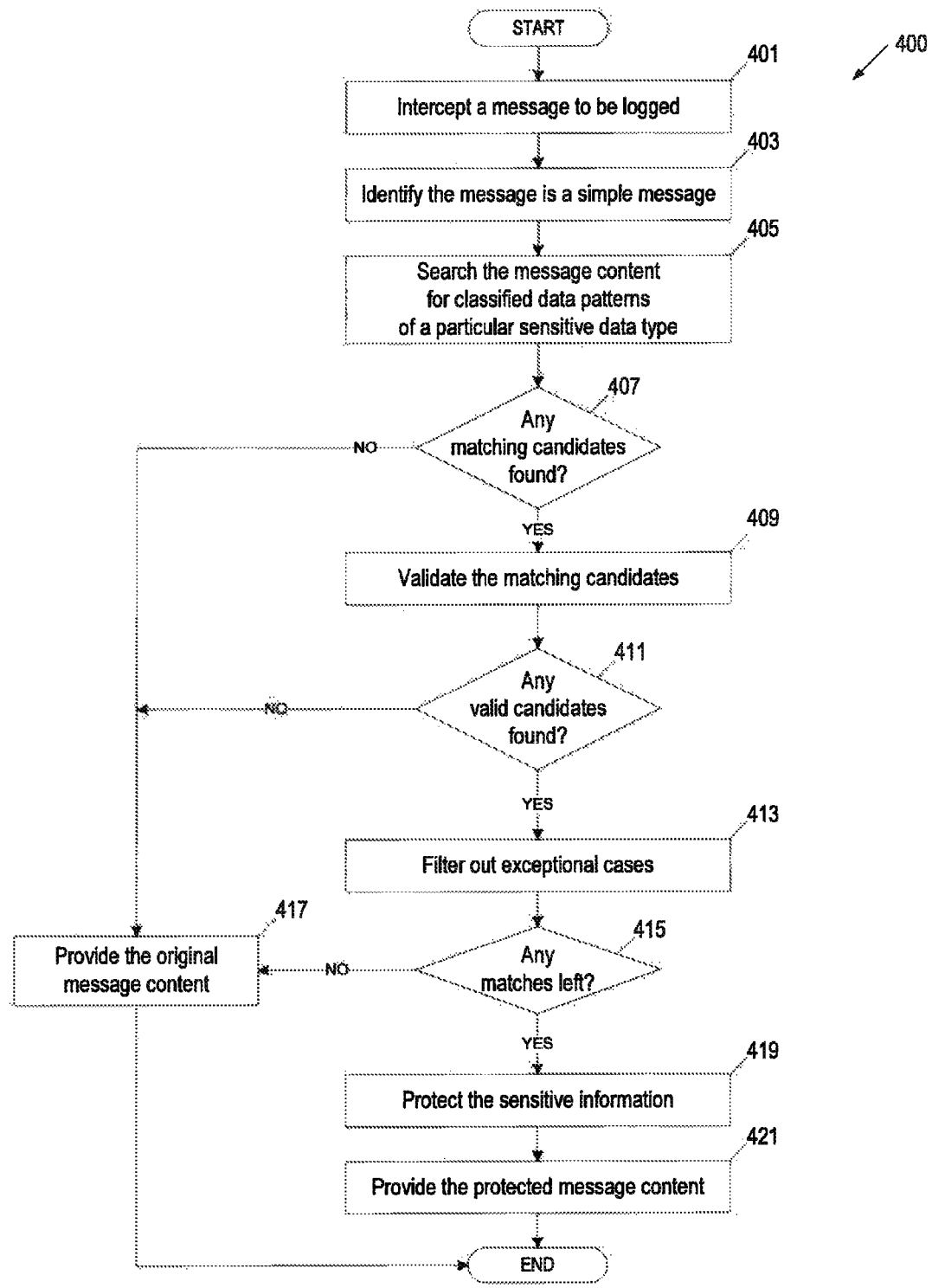
FIG. 4 is a flow diagram of an embodiment of a method for protecting sensitive information for an application log at runtime.

FIG. 4 is a flow diagram of an embodiment of a method 400 for protecting sensitive information for an application log at runtime. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a sensitive data protection subsystem 103 of FIG. 1.

At block 401, processing logic intercepts an original message generated by an application at runtime. The message includes content to be logged in a log data store. At block 403, processing logic identifies from the content of the original message that the message is a simple message by determining that the message content does not contain any computer programming class objects.

At block 405, processing logic searches the content of the original message for data that resembles a type of sensitive information (sensitive data). Examples of types of sensitive information can include, and are not limited to, personal identifiers, bank names, credit card institution names, account balances, IP addresses, etc. Processing logic performs the search using sensitive data patterns associated with the types of sensitive information. Processing logic searches the content of the original message for data expressed in a format that matches any of the sensitive data patterns for a particular type. For example, processing logic searches a message for data in a format that matches any of the sensitive data patterns for personal identifiers, which correspond to variations of personal identifier formats.

If no matching candidates are found (block 407), processing logic provides the content of the original message to a logging module at block 417. If any matching candidates, such as sets of data that have the format that matches any of the sensitive data patterns for the particular type of sensitive data (e.g., personal identifiers), are found (block 407), processing logic determines whether these candidates are valid or are false positives at block 411. Processing logic applies a list of sensitive data validators that pertain to the particular type of sensitive data to the candidates and determines which of the candidates are likely to be sensitive data (e.g., a personal identifier) or a false positive. The validators may be configured by the user to satisfy specific requirements. The validators may include, for example, checksum algorithms (e.g., lunh checksum), checks against valid (or invalid) ranges of numbers within a potential match, checks for a valid prefix or suffix of a potential match, checks for valid digits or number of digits within a potential match, search of the message for one or more keywords, etc.

If none of matching candidates are valid (block 411), processing logic provides the content of the original message to a logging module at block 417. If any of the matching candidates are valid (block 411), processing logic filters out exceptional cases using exceptional case data patterns associated with exceptional cases for the particular type of sensitive data to eliminate false positives at block 413. Processing logic searches the valid candidates for data that resembles exceptional cases. Processing logic performs the search using exceptional case data patterns associated with the particular type of sensitive information. For example, the personal identifiers type of sensitive information can have an exceptional case data pattern that represents session IDs. Processing logic searches the content of the original message for data expressed in a format that matches any of the exceptional case data patterns, which correspond to the variations of exceptional case data formats. For example, processing logic searches the personal identifier valid candidates for data in a format that matches any of the exceptional case data patterns of session IDs, which correspond to variations of session ID formats.

If all of the valid candidates match the data patterns for exceptional cases and no matches are left (block 415), processing logic determines that the message does not contain sensitive information and provides the original message content to a logging module at block 417. If any valid candidates are left (block 415), processing logic protects the sensitive information of the valid candidates that are left at block 419. In one embodiment, processing logic creates a new message that protects the sensitive data in the new message, for example, by removing, masking, and/or redacting the sensitive information. The new message can include a copy of any content in the original message that is not sensitive data. The new message can also include additional information, which is not contained in an original message, such as, the application stack trace (line number of application source code) that is associated with an original message and keywords that are associated with a message. In another embodiment, processing logic can modify an original message to protect the sensitive data and include additional information and provide the modified message to a logging module. At block 421, processing logic provides the protected message content to a logging module. Processing logic can provide the new message that contains the protected information and any original message content that is not sensitive data to the logging module or processing logic can provide a modified original message.

For example, processing logic searches an original application message for content that matches sensitive data patterns of credit cards and identifies content in the original application message that includes five sets of 16 consecutive digits which match a 16-digit credit card pattern. Processing logic determines whether the five candidates are valid using the validator for the credit card sensitive data type, such as a luhn algorithm, which is a simple checksum formula used to validate credit card numbers. Two candidates may not be valid and processing logic identifies these two sets of 16 consecutive digits as non-sensitive data. Three candidates may be valid and processing logic determines whether any of the three candidates are exceptional cases relating to the credit card sensitive data type. The credit card sensitive data type can have exceptional case data patterns, such as a session ID data patter pattern and a serial number data pattern. Processing logic determines that two candidates are not credit card numbers, but rather, one of the three candidates matches an exceptional case data pattern of a session ID, and another one of the three candidates matches an exceptional case data pattern of a serial number. Processing logic identifies the one remaining matching candidate and protects the sensitive data of the remaining candidate by masking the first 12 digits of the candidate. Processing logic creates a new message that contains the masked data of the remaining candidate, as well as the original data of the non-sensitive data (e.g. the data of the other four candidates and other non-sensitive data contained in the original message), and additional data (e.g., line of source code corresponding to the message containing sensitive data, keywords, etc.) and provides the new message to a logging module.

In one embodiment, when a simple message does not contain any sensitive data, processing logic may add additional information (e.g., line of source code, keywords, etc.) to an original simple message and provide it to a logging module at block 417.

Method 400 can be an iterative method. The number of iterations can be based on the number of predefined sensitive data patterns. For example, there may be three pre-defined sensitive data patterns, such as patterns for social security numbers, credit card numbers, and telephone numbers. Processing logic can search an intercepted message for pattern matches pertaining to a first sensitive data pattern (e.g., social security numbers), validate any matching candidates for the first sensitive data pattern, filter out exceptional cases pertaining to the first sensitive data pattern, and protect the sensitive data, and subsequently perform method 400 for the sensitive data patterns for credit card numbers and for telephone numbers.

Figure 5:
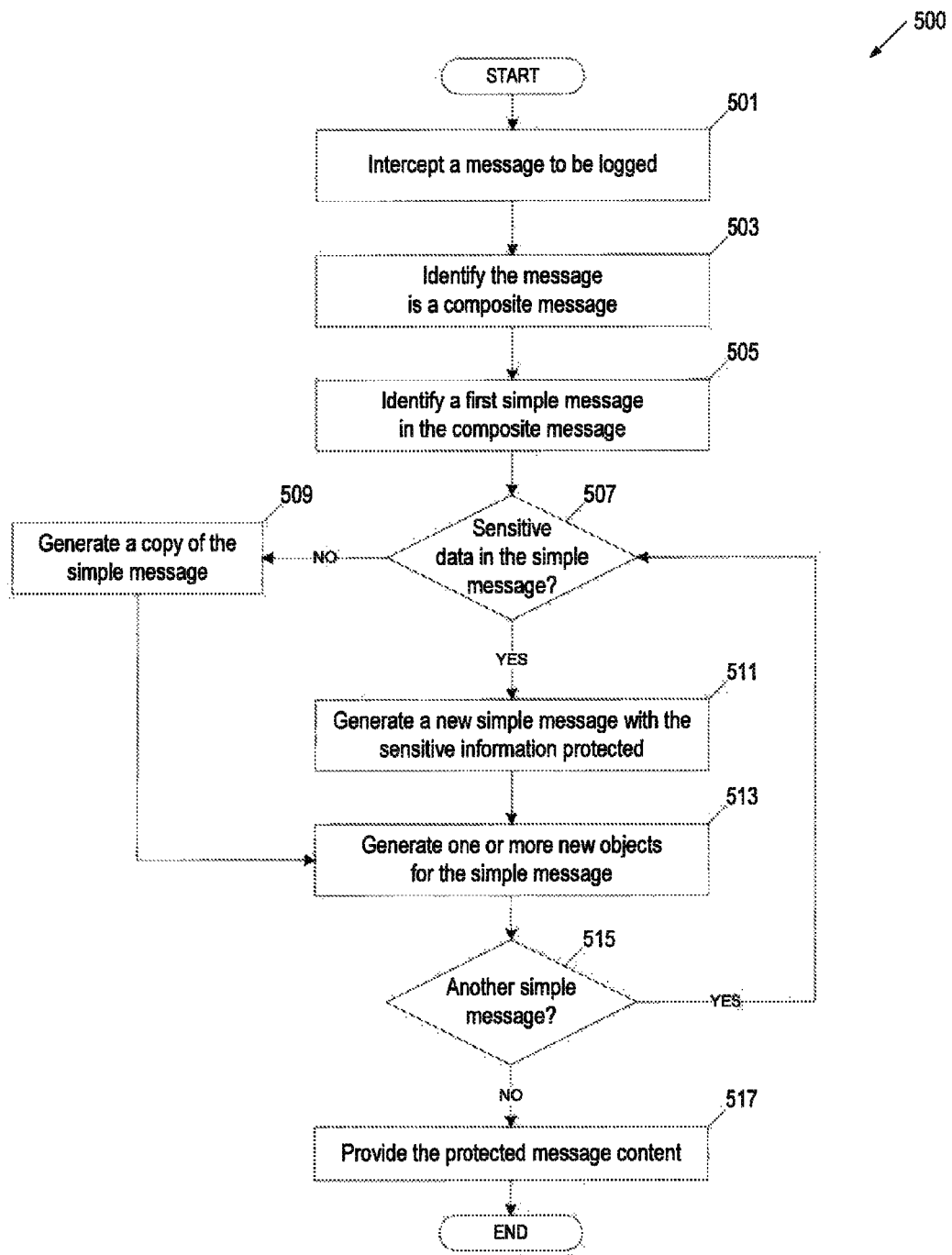
FIG. 5 is a flow diagram of an embodiment of a method for protecting sensitive information in composite messages for an application log at runtime.

FIG. 5 is a flow diagram of an embodiment of a method 500 for protecting sensitive information in a composite message for an application log at runtime. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by a sensitive data protection subsystem 103 of FIG. 1.

At block 501, processing logic intercepts a message to be logged and identifies the message is a composite message by detecting one or more objects in the message at block 503. Processing logic applies a recursive algorithm to examine the objects and messages of the composite message as a whole. At block 505, processing logic identifies a first simple message in the composite message. Processing logic can identify the bottom "leaf" of the tree structure of the composite message as the first simple message.

At block 507, processing logic can determine whether there is sensitive data in the simple message, for example, as described in the embodiment of FIG. 4. If there is no sensitive information in the simple message, processing logic can generate a copy of the simple message at block 509. Processing logic can generate copies and/or new messages and objects to reconstruct a new composite message to be logged.

If there is sensitive data in the simple message (block 507), processing logic generates a new simple message with the sensitive information protected at block 511. Processing logic can protect the sensitive information, for example, by removing, masking, and/or redacting the sensitive information as described in the embodiment of FIG. 4. At block 513, processing logic creates one or more new class objects for the simple message. For example, for the first simple message, processing logic creates a new root object and a new cause object. For other simple messages in the composite message that are subsequently examined, the new root object has already been created, and processing logic simply creates a new cause object for a subsequent simple message.

If there is another simple message in the original composite message to be examined (block 515), processing logic returns to block 507 to determine whether there is any sensitive information in the simple message. If there are no other simple messages in the original composite message to be examined (block 515), processing logic provides the protected message content to a logging module at block 517. Processing logic can provide a new composite message as the protected data. The new composite message can include a new root object, any new or copied simple messages, any new or copied cause objects, and any additional information not included in the original composite message (e.g., line of source code, keywords, etc.).

In one embodiment, when a composite message does not contain any sensitive data, processing logic may not generate a new composite message, but may provide the original composite message to a logging module at block 517. In another embodiment, when a composite message does not contain any sensitive data, processing logic may add additional information (e.g., line of source code, keywords, etc.) to an original composite message and provide it to a logging module at block 517.

Figure 6:
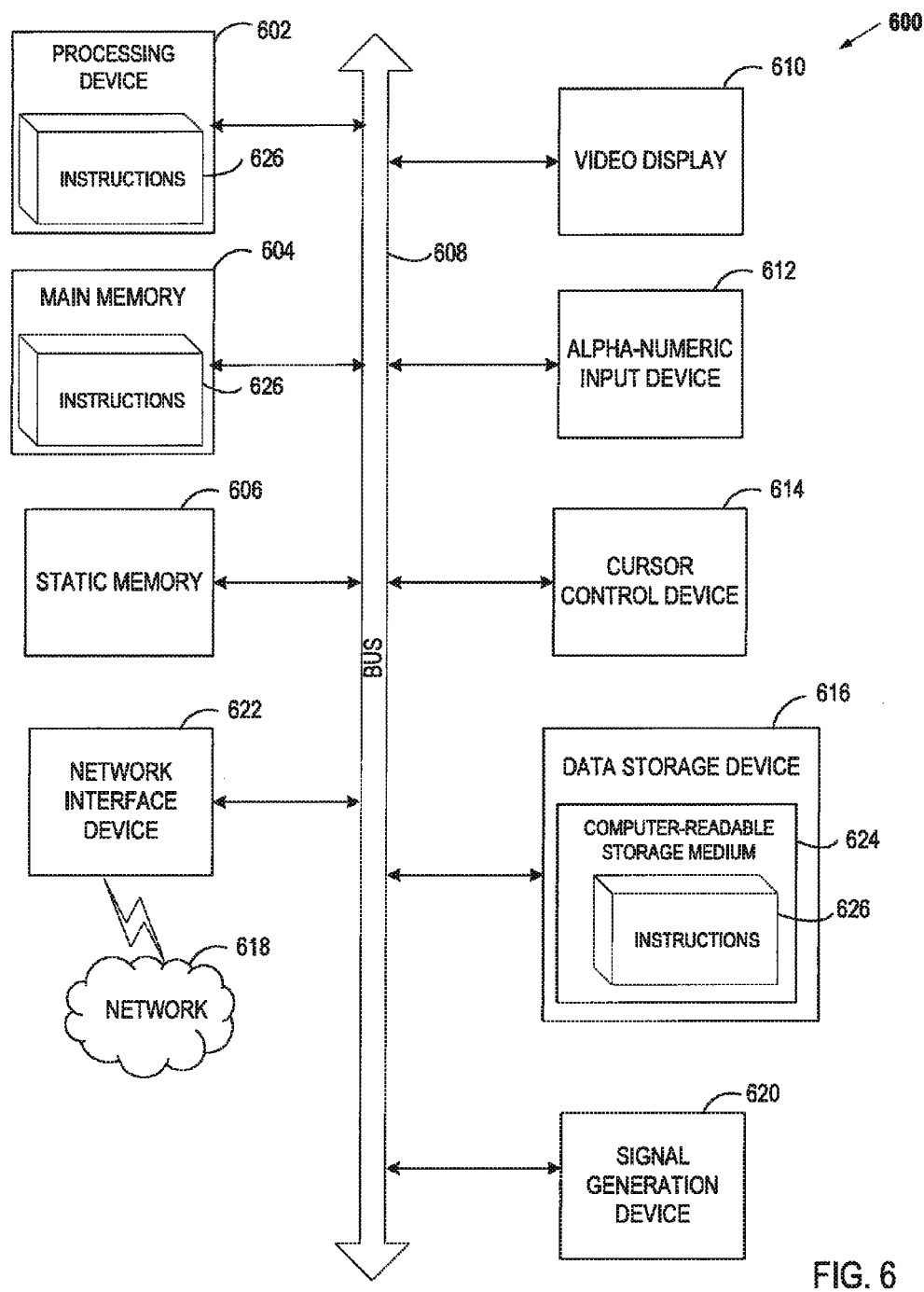
FIG. 6 is a diagram of one embodiment of a computer system that may perform one or more of the operations described herein.

FIG. 6 is a diagram of one embodiment of a computer system for protecting sensitive information for an application log at runtime. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. The instructions 626 may further be transmitted or received over a network 618 via the network interface device 622.

The computer-readable storage medium 624 may also be used to store the instructions 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 626, components and other features described herein (for example in relation to FIG. 2) can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "intercepting," "identifying," "protecting," "providing," "storing," "finding," "validating," "determining," "removing," "masking," "redacting," "creating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for protecting sensitive information for an application log at runtime is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   intercepting, by a processing device executing a first application, a method call of a log message originating from a second application at runtime, the log message containing information to be stored in a log data, the method call being derived from application source code of the second application;
   determining whether the log message is a simple message or a composite message, wherein a composite message contains a plurality of objects;
   when the message is a simple message, identifying, after intercepting the method call, sensitive information in the log message without tagging the sensitive information as sensitive, the identifying comprising:
      finding in the log message a set of data comprising a format that matches a sensitive data pattern, validating the found set of data to eliminate false positives, and determining that the found set of data does not contain data in a format that matches any of a plurality of exceptional case data patterns;

when the message is a composite message, performing a recursive algorithm to examine each of the objects of the composite message, wherein the performing comprises:

determining whether the object contains a set of data comprising a format that matches a sensitive data pattern, when the set of data is determined to comprise the format that matches a sensitive data pattern, validating the determined set of data to eliminate false positives, and determining that the set of data does not contain data in a format that matches any of a plurality of exceptional case data patterns;

modifying the log message to protect the sensitive information; and causing the modified log message to be logged in the log data.

2. The method of claim 1, wherein the sensitive information comprises one or more of a credit card number, a social security number, an account number, an employee number, a customer or patient number, an IP address, a driver license number, a license plate number, a password, a telephone number, a name, a username, or a birthdate.

3. The method of claim 1, wherein identifying sensitive information in the log message comprises:

storing a plurality of sensitive data patterns for sensitive information and the plurality of exceptional case data patterns for exceptional cases;

finding in the log message one or more sets of data comprising the format that matches any of the plurality of sensitive data patterns;

validating at least one found set of data is not the false positive by using one or more sensitive data validators; and determining that the at least one validated set of data does not contain data in a format that matches any of the plurality of exceptional case data patterns.

4. The method of claim 1, wherein modifying the log message to protect the sensitive information comprises at least one of removing the sensitive information, masking the sensitive information, or redacting the sensitive information to create the protected information.

5. The method of claim 1, wherein the modified log message comprises a line number of application source code that generated the log message at runtime.

6. The method of claim 1, wherein the log message is a composite message comprising at least one computer programming class object and at least one simple message comprising a string.

7. The method of claim 6, wherein:

modifying the log message to protect the sensitive information comprises at least one of removing the sensitive information, masking the sensitive information, or redacting the sensitive information to create the protected information; and creating at least one new class object to be logged in the log data, the new class object comprising a new log message having the protected information.

8. A system comprising:
a memory; and
a hardware processing device, coupled with the memory, the hardware processing device to:

intercept, by the hardware processing device executing a first application, a method call of a log message originating from a second application at runtime, the log message containing information to be stored in a log data, the method call being derived from application source code of the second application;

determine whether the log message is a simple message or a composite message, wherein a composite message contains a plurality of objects;

when the message is a simple message, identify, after intercepting the method call, sensitive information in the log message without tagging the sensitive information as sensitive, the identifying comprising:

finding in the log message a set of data comprising a format that matches a sensitive data pattern, and validating the found set of data to eliminate false positives, and determining that the found set of data does not contain data in a format that matches any of a plurality of exceptional case data patterns;

when the message is a composite message, perform a recursive algorithm to examine each of the objects of the composite message, wherein performing comprises:

determining whether the object contains a set of data comprising a format that matches a sensitive data pattern, when the set of data is determined to comprise the format that matches a sensitive data pattern, validating the determined set of data to eliminate false positives, and determining that the set of data does not contain data in a format that matches any of a plurality of exceptional case data patterns;

modify the log message to protect the sensitive information; and cause the modified log message to be logged in the log data.

9. The system of claim 8, wherein the sensitive information comprises one or more of a credit card number, a social security number, an account number, an employee number, a customer or patient number, an IP address, a driver license number, a license plate number, a password, a telephone number, a name, a username, or a birthdate.

10. The system of claim 8, wherein identifying sensitive information in the log message comprises:

storing a plurality of sensitive data patterns for sensitive information and the plurality of exceptional case data patterns for exceptional cases;

finding in the log message one or more sets of data comprising the format that matches any of the plurality of sensitive data patterns;

validating at least one found set of data is not the false positive by using one or more sensitive data validators; and determining that the at least one validated set of data does not contain data in a format that matches any of the plurality of exceptional case data patterns.

11. The system of claim 8, wherein the hardware processing device is to modify the log message to protect the sensitive information by:

at least one of removing the sensitive information, masking the sensitive information, or redacting the sensitive information to create the protected information.

12. The system of claim 8, wherein the modified log message comprises a line number of application source code that generated the log message at runtime.

13. The system of claim 8, wherein the log message is a composite message comprising at least one computer programming class object and at least one simple message comprising a string.

14. The system of claim 13, wherein the hardware processing device is to modify the log message to protect the sensitive information by:
   at least one of removing the sensitive information, masking the sensitive information, or redacting the sensitive information to create the protected information; and
   creating at least one new class object to be logged in the log data, the new class object comprising a new log message having the protected information.

15. A non-transitory computer readable storage medium including instructions that, when executed by a processing device, cause the processing device to perform operations comprising:
   intercepting, by the processing device executing a first application, a method call of a log message originating from a second application at runtime, the log message containing information to be stored in a log data, the method call being derived from application source code of the second application;
   determining whether the log message is a simple message or a composite message, wherein a composite message contains a plurality of objects;
   when the message is a simple message, identifying, after intercepting the method call, sensitive information in the log message without tagging the sensitive information as sensitive, the identifying comprising:
      finding in the log message a set of data comprising a format that matches a sensitive data pattern,
      validating the found set of data to eliminate false positives, and
      determining that the found set of data does not contain data in a format that matches any of a plurality of exceptional case data patterns;
   when the message is a composite message, performing a recursive algorithm to examine each of the objects of the composite message, wherein performing comprises:
      determining whether the object contains a set of data comprising a format that matches a sensitive data pattern,
      when the set of data is determined to comprise the format that matches a sensitive data pattern, validating the determined set of data to eliminate false positives, and
      determining that the set of data does not contain data in a format that matches any of a plurality of exceptional case data patterns;
   modifying the log message to protect the sensitive information; and
   causing the modified log message to be logged in the log data.

16. The non-transitory computer readable storage medium of claim 15, wherein the sensitive information comprises one or more of a credit card number, a social security number, an account number, an employee number, a customer or patient number, an IP address, a driver license number, a license plate number, a password, a telephone number, a name, a username, or a birthdate.

17. The non-transitory computer readable storage medium of claim 15, wherein identifying sensitive information in the log message comprises:
   storing a plurality of sensitive data patterns for sensitive information and the plurality of exceptional case data patterns for exceptional cases;
   finding in the log message one or more sets of data comprising the format that matches any of the plurality of sensitive data patterns;
   validating at least one found set of data is not the false positive by using one or more sensitive data validators; and
   determining that the at least one validated set of data does not contain data in a format that matches any of the plurality of exceptional case data patterns.

18. The non-transitory computer readable storage medium of claim 15, wherein modifying the log message to protect the sensitive information comprises:
   at least one of removing the sensitive information, masking the sensitive information, or redacting the sensitive information to create the protected information.

19. The non-transitory computer readable storage medium of claim 15, wherein the modified log message comprises a line number of application source code that generated the log message at runtime.

20. The non-transitory computer readable storage medium of claim 19, wherein modifying the log message to protect the sensitive information comprises:
   at least one of removing the sensitive information, masking the sensitive information, or redacting the sensitive information to create the protected information; and
   creating at least one new class object to be logged in the log data, the new class object comprising a new log message having the protected information.

* * * * *